(12) United States Patent
Kim

(10) Patent No.: US 6,930,535 B2
(45) Date of Patent: Aug. 16, 2005

(54) HIGH VOLTAGE SUPPLY CIRCUIT AND A METHOD OF SUPPLYING HIGH VOLTAGE

(75) Inventor: Kwan Weon Kim, Ichon-Shi (KR)

(73) Assignee: Hynix Semiconductor Inc., Kyungki-Do (KR)

(*) Notice: Subject to any disclaimer, the term of this patent is extended or adjusted under 35 U.S.C. 154(b) by 0 days.

(21) Appl. No.: 10/653,578

(22) Filed: Sep. 2, 2003

(65) Prior Publication Data

US 2005/0046465 A1 Mar. 3, 2005

(30) Foreign Application Priority Data

Aug. 25, 2003 (KR) ................................ 10-2003-0058630

(51) Int. Cl.[7] ................................................ G05F 1/46
(52) U.S. Cl. ...................................... 327/536; 365/227
(58) Field of Search ................................ 327/536, 537, 327/544; 363/59, 60; 365/189.09, 227

(56) References Cited

U.S. PATENT DOCUMENTS

| | | | | |
|---|---|---|---|---|
| 6,275,096 B1 | * | 8/2001 | Hsu et al. | 327/535 |
| 6,285,622 B1 | * | 9/2001 | Haraguchi et al. | 365/226 |
| 6,320,457 B1 | * | 11/2001 | Yang | 327/536 |
| 6,429,725 B1 | * | 8/2002 | Tanzawa et al. | 327/536 |
| 6,430,092 B2 | * | 8/2002 | Nanba | 365/189.11 |
| 6,774,708 B2 | * | 8/2004 | Matsui | 327/536 |

* cited by examiner

*Primary Examiner*—Timothy P. Callahan
*Assistant Examiner*—Terry L. Englund
(74) *Attorney, Agent, or Firm*—Marshall, Gerstein & Borun LLP

(57) ABSTRACT

A high voltage supply circuit and method of supplying a high voltage are disclosed. A second pumping voltage-generating unit, in addition to a primary pumping voltage-generating unit for generating a pumping voltage, is provided. The second pumping voltage-generating unit is operated for a certain time simultaneously with the primary voltage-generating unit when a normal operating mode is switched to an auto-refresh operating mode where current consumption is abruptly increased in order to raise the pumping voltage higher than a target voltage. Therefore, the resulting pumping voltage is prevented from being lower than the target voltage even if the operating mode where current consumption is abruptly increased is entered, and the reliability of the circuit is therefore increased.

9 Claims, 2 Drawing Sheets

HIGH VOLTAGE SUPPLY CIRCUIT AND A METHOD OF SUPPLYING HIGH VOLTAGE

BACKGROUND OF THE INVENTION

The present invention relates to a high voltage supply circuit and method of supplying a high voltage, and more particularly, to a high voltage supply circuit and method of supplying a high voltage, capable of preventing a pumping voltage from being lowered than a target voltage.

In general, a unit cell of a DRAM consists of one MOS type transistor serving as a switch and one capacitor for storing a charge (data). A plurality of the unit cells are classified into banks. At this time, the unit cell has a binary data stored therein. Depending on a charge state stored in the capacitor included in the unit cell, the data stored in the unit cell is divided into '1' or '0'. As such, as the data is decided depending on the charge stored in the capacitor, there is no power consumption in principle.

As the leakage current occurs in a PN junction of the MOS transistor, etc., however, the amount of the charge stored in the capacitor is gradually reduced as time goes by. For this reason, there is a high possibility that the data may be lost. Therefore, in order to prevent the data from being lost, it is required that after reading a data of a memory cell, the charge be recharged again into the capacitor depending on its information. Such operation is called 'a refresh operation'. It is required that the refresh operation be periodically repeated so that the data is not lost. A voltage that is applied to the unit cell for the refresh operation is hereinafter referred to as 'a refresh voltage'. As the refresh voltage is higher than the power supply voltage, a pumping voltage being a result that the power supply voltage is raised over a given voltage is used as the refresh voltage.

FIG. 1 is a block diagram illustrating a conventional high voltage supply circuit.

Referring to FIG. 1, the high voltage supply circuit for generating a high voltage such as the refresh voltage used in a DRAM includes a pumping voltage detector 110, an oscillator 120 and a pumping unit 130.

If the entire circuit is initialized and then normally starts to operate, an active signal is generated. The active signal is applied to the pumping voltage detector 110 as an enable signal E1. Based on the enable signal, the pumping voltage detector 110 determines the potential of a pumping voltage (Vpp) generated in the pumping unit 130. The oscillator 120 generates a pulse signal according to the output signal of the pumping voltage detector 110. The pumping unit 130 raises the power supply voltage (Vdd) using the pulse signal generated in the oscillator 120, to generate the pumping voltage (Vpp). The pumping unit 130 then supplies the raised pumping voltage (Vpp) to a peripheral circuit 140. At this time, the pumping voltage detector 110 determines the potential of the pumping voltage (Vpp) generated in the pumping unit 130. As a result of the determination, if the pumping voltage (Vpp) is lower than a target voltage, the pumping voltage detector 110 operates the oscillator 120 to consistently raise the power supply voltage (Vdd) until the pumping voltage (Vpp) becomes equal to the target voltage. If the pumping voltage (Vpp) becomes equal to the target voltage, the pumping voltage detector 110 stops the operation of the oscillator 120 so that the pumping operation is stopped.

Meanwhile, the cells included in the DRAM are classified into the banks. In a normal operating mode, only one bank is enabled or a plurality of the banks are sequentially enabled. In this case, since the word lines, etc. are sequentially selected, the peak current depending on the pumping voltage (Vpp) is adequately distributed and supplied.

If the normal operating mode is switched to an auto-refresh operating mode, however, the plurality of the banks are enabled at the same time. Due to this, the pumping voltage (Vpp) is lowered while the pumping voltage (Vpp) is applied to all the banks. At this time, the pumping voltage detector 110 operates the oscillator 120 so that the pumping operation is performed when the pumping voltage (Vpp) becomes lower than the target voltage. If the oscillator 120 is operated to generate the pulse, the pumping unit 130 performs the pumping operation to raise the pumping voltage (Vpp) up to the target voltage again.

As such, the conventional high voltage supply circuit can always keep the pumping voltage (Vpp) equal to the target voltage. However, if the normal mode is switched to an operating mode where current consumption is abruptly increased such as the auto-refresh operation, there is a problem that the pumping voltage (Vpp) is lower than the target voltage and is then increased up to the target voltage. In other words, until the pumping voltage detector 110 senses the reduced pumping voltage (Vpp) and then performs the pumping operation to raise the pumping voltage (Vpp) up to the target voltage again, the circuit is operated in a state where the pumping voltage (Vpp) is lower than the target voltage. The circuit may be thus erroneously operated in this period. Accordingly, there is a problem that reliability in the operation of the circuit is degraded.

SUMMARY OF THE INVENTION

The present invention is contrived to solve the aforementioned problems. An object of the present invention is to provide a high voltage supply circuit and method of supplying a high voltage, which can prevent a pumping voltage from being lower than a target voltage even if the circuit enters an operating mode where current consumption is abruptly increased, and stably operate the circuit to increase reliability of the circuit, in such a manner that an assistant pumping voltage-generating unit other than a pumping voltage-generating unit for generating the pumping voltage is further provided, and the assistant pumping voltage-generating unit is operated for a certain time simultaneously when a normal operating mode is switched to the operating mode where current consumption is abruptly increased, thus raising the pumping voltage higher than the target voltage.

According to one aspect of the present invention for achieving the object, there is provided a high voltage supply circuit, comprising a first pumping voltage-generating unit for generating a first pumping voltage higher than a power supply voltage to supply the first pumping voltage to a peripheral circuit, and a second pumping voltage-generating unit for generating a second pumping voltage higher than the power supply voltage according to a second operating mode signal when a first operating mode is switched to a second operating mode where current consumption is increased, and then supplying the second pumping voltage to an output terminal of the first pumping voltage-generating unit.

In the above, the first pumping voltage-generating unit comprises an oscillator for generating a given pulse, a pumping unit for raising the power supply voltage according to the pulse to generate the first pumping voltage, and a pumping voltage detector that operates the oscillator until the first pumping voltage is raised up to a target voltage if the first pumping voltage is lower than the target voltage.

The second pumping voltage-generating unit comprises an operating mode decision unit for generating an enable signal according to the second operating mode signal, an oscillator for generating a given pulse according to the enable signal, and a pumping unit for raising the power supply voltage according to the pulse to generate the second pumping voltage.

At this time, the operating mode decision unit generates the enable signal only for a target time at the same time when the second operating mode is entered. This operating mode decision unit comprises an inverse delay unit for inversely delaying the second operating mode signal for the target time, a NAND gate for logically combining the second operating mode signal and an output signal of the inverse delay unit, and an inverter for inverting the output signal of the NAND gate to generate the enable signal. At this time, the second operating mode signal is a refresh flag signal and the second operating mode is an auto-refresh operating mode.

Meanwhile, the inverse delay unit includes an odd number of inverters that are serially connected. The target time is controlled depending on the number of the inverter included in the inverse delay unit.

According to one aspect of the present invention for achieving the object, there is provided a method of supplying a high voltage, comprising the steps of supplying a first pumping voltage to a peripheral circuit in a first operating mode, and generating a second pumping voltage when a first operating mode is switched to a second operating mode where current consumption is increased and then supplying the second pumping voltage to the peripheral circuit along with the first pumping voltage.

At this time, the second pumping voltage is supplied to the peripheral circuit at the same time when the second operating mode is entered and is supplied only for a certain time.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

The present invention will now be described in detail in connection with preferred embodiments with reference to the accompanying drawings.

Figure 1:
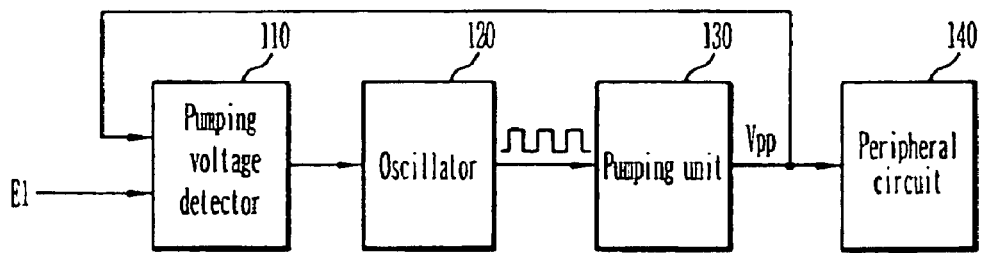
FIG. 1 is a block diagram illustrating a conventional high voltage supply circuit.
Figure 2:
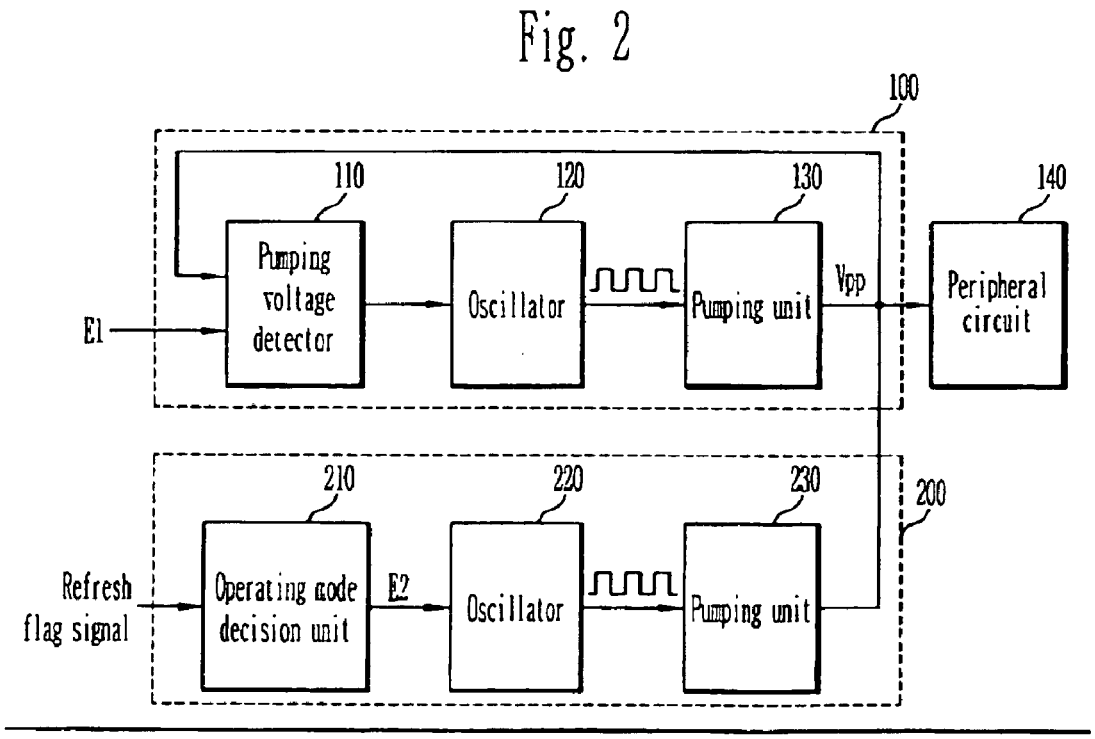
FIG. 2 is a block diagram illustrating a high voltage supply circuit according to one embodiment of the present invention.

FIG. 2 is a block diagram illustrating a high voltage supply circuit according to one embodiment of the present invention.

Referring to FIG. 2, the high voltage supply circuit of the present invention includes a first pumping voltage-generating unit 100 and a second pumping voltage-generating unit 200. The first pumping voltage-generating unit 100 includes a pumping voltage detector 110, an oscillator 120 and a pumping unit 130.

If the entire circuit is initialized and then normally starts to operate, an active signal is generated. The active signal is applied to the pumping voltage detector 110 as an enable signal E1. Based on the enable signal, the pumping voltage detector 110 determines the potential of a pumping voltage (Vpp) generated in the pumping unit 130. The oscillator 120 generates a pulse signal according to the output signal of the pumping voltage detector 110. The pumping unit 130 raises the power supply voltage (Vdd) using the pulse signal generated in the oscillator 120, to generate the pumping voltage (Vpp). The pumping unit 130 then supplies the raised pumping voltage (Vpp) to a peripheral circuit 140. At this time, the pumping voltage detector 110 determines the potential of the pumping voltage (Vpp) generated in the pumping unit 130. As a result of the determination, if the pumping voltage (Vpp) is lower than a target voltage, the pumping voltage detector 110 operates the oscillator 120 to consistently raise the power supply voltage (Vdd) until the pumping voltage (Vpp) becomes equal to the target voltage. If the pumping voltage (Vpp) becomes equal to the target voltage, the pumping voltage detector 110 stops the operation of the oscillator 120 so that the pumping operation is stopped.

If a first operating mode is switched to a second operating mode where current consumption is abruptly increased, the first pumping voltage (Vpp) generated in the first pumping voltage-generating unit 100 becomes lower than the target voltage. A given time is taken to raise the first pumping voltage (Vpp) to the target voltage again. For this reason, for a certain time after the second operating mode is entered, the first pumping voltage (Vpp) lower than the target voltage may be supplied.

In order to prevent the first pumping voltage (Vpp) from being lower than the target voltage, the second pumping voltage-generating unit 200 generates a second pumping voltage higher than the power supply voltage according to the second operating mode signal at the same time when the first operating mode (for example, a normal operating mode) is switched to the second operating mode (for example, an auto-refresh operating mode in a DRAM) where current consumption is increased. The unit 200 then supplies the second pumping voltage to an output terminal of the first pumping voltage-generating unit 100. This will be below described in more detail.

The second pumping voltage-generating unit 200 includes an operating mode decision unit 210, an oscillator 220 and a pumping unit 230. The operating mode decision unit 210 generates an enable signal E2 according to the second operating mode signal when the first operating mode is switched to the second operating mode where current consumption is increased. The oscillator 220 generates a given pulse according to the enable signal E2. Further, the pumping unit 230 raises the power supply voltage according to the pulse generated in the oscillator 220 to generate the second pumping voltage. The pumping unit 230 supplies the second pumping voltage to the output terminal of the first pumping voltage-generating unit 100.

At this time, in a case where the high voltage supply circuit included in the DRAM generates the high voltage (Vpp) for an internal auto-refresh operation, the first operating mode may become the normal operating mode and the second operating mode may become the auto-refresh operating mode. In this case, a refresh flag signal caused by an auto-refresh command may be applied to the operating mode decision unit 210 as the second operating mode signal. At this time, the refresh flag signal is a signal that is generated by the auto-refresh command externally, which informs the start and end of the refresh operation. If the second operating mode (auto-refresh operating mode) where current consumption is increased is entered with the application of the refresh flag signal, the operating mode decision unit 210 generates the enable signal E2 simultaneously when the refresh flag signal is applied thereto. If the enable signal E2 is inputted to the oscillator 220, the oscillator 220 generates a given pulse. The pumping unit 230 raises the power supply voltage according to the pulse to generate the second pumping voltage. The pumping unit 230 applies the second pumping voltage to the output terminal of the first pumping voltage-generating unit 100.

Meanwhile, if the second pumping voltage-generating unit 200 continues to operate after the second operating mode is entered, the potential at the output terminal of the first pumping voltage-generating unit 100 continues to increase. Therefore, it is preferred that the second pumping voltage-generating unit 200 is operated only for a certain time so that the second pumping voltage can be supplied to the output terminal of the first pumping voltage-generating unit 100 only to the extent that the first pumping voltage (Vpp) of the first pumping voltage-generating unit 100 is not lower than the target voltage. To this end, the operating mode decision unit 210 generates the enable signal E2 only for a certain time if the second operating mode signal is applied thereto. A detailed embodiment of such operating mode decision unit 210 will now be described.

Figure 3:
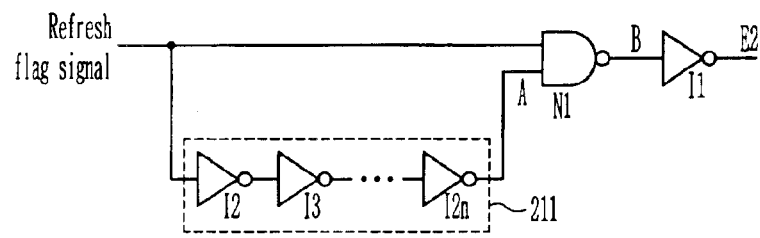
FIG. 3 is a detailed circuit diagram illustrating the operating mode decision unit shown in FIG. 2 according to one embodiment of the present invention.

FIG. 3 is a detailed circuit diagram illustrating the operating mode decision unit shown in FIG. 2 according to one embodiment of the present invention.

Referring to FIG. 3, the operating mode decision unit 210 for generating the enable signal E2 only for a certain time may consist of an inverse delay unit 211 and a plurality of logical devices. In more detail, the operating mode decision unit 210 includes the inverse delay unit 211 for inversely delaying the second operating mode signal (for example, refresh flag signal) by a target time, a NAND gate N1 for logically combining the second operating mode signal and the output signal of the inverse delay unit 211, and an inverter I1 for inverting the output signal of the NAND gate N1 to generate the enable signal E2. In the above, the inverse delay unit 211 may include an odd number of inverters that are serially connected. The inverse delay unit 211 may control the degree of delay of the refresh flag signal being the second operating mode signal, i.e., time when the enable signal E2 is generated, depending on the number of the inverter.

Figure 4:
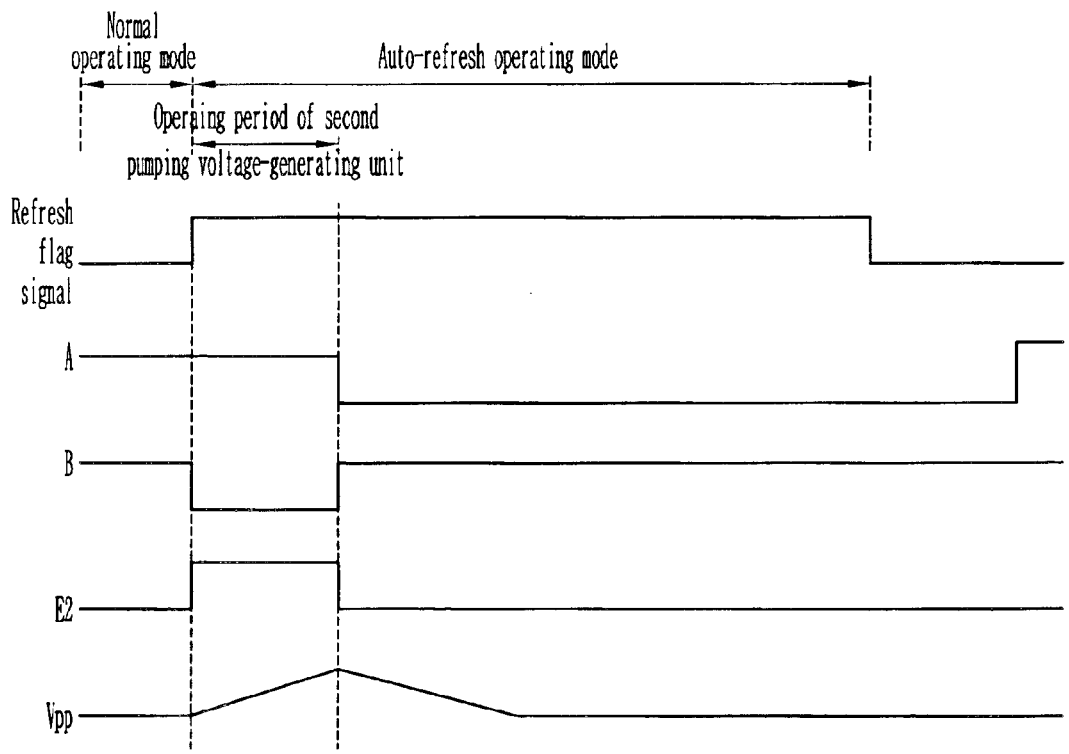
FIG. 4 shows a waveform for explaining the operation of the high voltage supply circuit according to one embodiment of the present invention.

The operation of the high voltage supply circuit when the first operating mode (normal operating mode) is switched to the second operating mode (autorefresh operating mode), will be below described with reference to the detailed circuit diagram shown in FIG. 3 and a waveform shown in FIG. 4. FIG. 4 shows the waveform for explaining the operation of the high voltage supply circuit according to one embodiment of the present invention.

Normal Operating Mode

In the normal operating mode, the refresh flag signal is applied as a LOW level. If the refresh flag signal of the LOW level is applied to the NAND gate N1 of the operating mode decision unit 210, the NAND gate N1 outputs a signal of a HIGH level. This signal is inverted by the inverter I1, so that the enable signal E2 is outputted as a LOW level (inactivated). Therefore, the first pumping voltage-generating unit is operated, but the second pumping voltage-generating unit is not operated and the second pumping voltage is also not generated. As the current is not consumed a lot in the normal operating mode, the pumping voltage can be sufficiently stably applied to the peripheral circuit only with the first pumping voltage-generating unit 100.

In this state, if the auto-refresh operating mode being the second operating mode where current consumption is increased with the application of the refresh flag signal is entered, the second pumping voltage-generating unit 200 is operated for a certain time at the same time when the refresh flag signal is applied thereto, so that the first pumping voltage (Vpp) generated in the first pumping voltage-generating unit 100 is prevented from being lowered. This will be below described in more detail.

Auto-refresh Operating Mode

If the refresh flag signal is applied as a HIGH level, the refresh flag signal is applied to the operating mode decision unit of the second pumping voltage-generating unit while the auto-refresh operating mode is entered. The refresh flag signal of the HIGH level is applied to a first input terminal of the NAND gate N1 in the operating mode decision unit. Meanwhile, since the inverse delay unit 211 inverts the refresh flag signal of the HIGH level to the LOW level after a lapse of a certain time, the output signal of the inverse delay unit 211 is kept at the HIGH level for a certain time. The output signal of the HIGH level is applied to a second input terminal of the NAND gate N1. As the signal of the HIGH level is applied to the first and second input terminals of the NAND gate N1, the NAND gate N1 outputs a signal of the LOW level. The signal of the LOW level is then inverted by the inverter I1, so that the enable signal E2 is generated as the HIGH level (activate).

If the enable signal E2 is activated, the oscillator and the pumping unit in the second pumping voltage-generating unit are operated to generate the second pumping voltage. This voltage is applied to the output terminal of the first pumping voltage-generating unit. Through this operation, it is possible to prevent the pumping voltage from being lowered even if current consumption is increased.

After a lapse of a certain time, the inverse delay unit 211 inverts the refresh flag signal of the HIGH level to a LOW level. The inverted refresh flag signal of the LOW level is applied to the second input terminal of the NAND gate N1. The NAND gate N1 outputs a signal of a HIGH level according to the signal of the LOW level from the inverse delay unit 211 regardless of the refresh flag signal. The signal of the HIGH level is then inverted by the inverter I1, so that the enable signal E2 is generated as the LOW level (inactivated).

If the enable signal E2 is inactivated, the operation of the oscillator and the pumping unit in the second pumping voltage-generating unit is stopped. In other words, the operation of the second pumping voltage-generating unit is stopped and only the first pumping voltage-generating unit continues to operate.

As such, in a period in which the auto-refresh operating mode where current consumption may be increased and the pumping voltage may be lower is entered, the pumping voltage is supplied to the output terminal of the first pumping voltage-generating unit regardless of variation in the pumping voltage in advance. Accordingly, it is possible to prevent the pumping voltage from being lower than the target voltage.

According to the present invention described above, even if a normal operating mode is switched to an operating mode where current consumption is abruptly increased, an assistant pumping voltage-generating unit prevents a pumping voltage from being lowered than a target voltage. Therefore, the present invention has new effects that it can stably operate a circuit and thus improve reliability of the circuit.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A high voltage supply circuit, comprising:
   a first pumping voltage-generating unit for generating a first pumping voltage higher than a power supply voltage to supply the first pumping voltage to a peripheral circuit through an output terminal, wherein the first pumping voltage-generating unit is operated in a normal operating mode and in an auto-refresh operating mode; and
   a second pumping voltage-generating unit for generating a second pumping voltage during a certain time after the normal operating mode is switched to the auto-refresh operating mode, and then supplying the second pumping voltage to the output terminal of the first pumping voltage-generating unit whereby the second pumping voltage boosts the voltage of the ouput terminal to a level higher than the first pumping voltage during said certain time.

2. The high voltage supply circuit as claimed in claim 1, wherein the first pumping voltage-generating unit comprises:
   an oscillator for generating a given pulse according to an output signal of a pumping voltage detector;
   a pumping unit for raising the power supply voltage according to the pulse to generate the first pumping voltage; and
   the pumping voltage detector operates the oscillator until the first pumping voltage is raised up to a target voltage if the first pumping voltage is lower than the target voltage.

3. The high voltage supply circuit as claimed in claim 1, wherein the second pumping voltage-generating unit comprises:
   an operating mode decision unit for generating an enable signal according to an auto-refresh operating mode signal;
   an oscillator for generating a given pulse according to the enable signal; and
   a pumping unit for raising the power supply voltage according to the pulse to generate the second pumping voltage.

4. The high voltage supply circuit as claimed in claim 3, wherein the operating mode decision unit generates the enable signal only for a target time at the same time when auto-refresh operating mode is entered.

5. The high voltage supply circuit as claimed in claim 4, wherein the operating mode decision unit comprises:
   an inverse delay unit for inversely delaying the auto-refresh operating mode signal for the target time;
   a NAND gate for logically combining the auto-refresh operating mode signal and an output signal of the inverse delay unit; and
   an inverter for inverting an output signal of the NAND gate to generate the enable signal.

6. The high voltage supply circuit as claimed in claim 3, wherein the auto-refresh operating mode signal is a refresh flag signal.

7. The high voltage supply circuit as claimed in claim 5, wherein the inverse delay unit includes an odd number of inverters that are serially connected.

8. The high voltage supply circuit as claimed in claim 7, wherein the target time is controlled depending on the number of the inverters included in the inverse delay unit.

9. A method of supplying a high voltage, comprising the steps of:
   supplying a first pumping voltage to a peripheral circuit through an output terminal in a normal operating mode and in an auto-refresh operating mode; and
   generating a second pumping voltage for a certain time when the normal operating mode is switched to the auto-refresh operating mode and then supplying the second pumping voltage to the peripheral circuit along with the first pumping voltage whereby voltage of the output terminal is higher than the first pumping voltage during the certain time.

* * * * *